United States Patent
Jackson

(10) Patent No.: US 10,051,982 B2
(45) Date of Patent: Aug. 21, 2018

(54) WALL HANGING SYSTEM

(71) Applicant: Jeffery L. Jackson, Vancouver, WA (US)

(72) Inventor: Jeffery L. Jackson, Vancouver, WA (US)

( * ) Notice: Subject to any disclaimer, the term of this patent is extended or adjusted under 35 U.S.C. 154(b) by 0 days.

(21) Appl. No.: 15/590,448

(22) Filed: May 9, 2017

(65) Prior Publication Data

US 2017/0238732 A1   Aug. 24, 2017

Related U.S. Application Data

(63) Continuation of application No. 14/668,694, filed on Mar. 25, 2015.

(51) Int. Cl.
| | |
|---|---|
| *A47G 1/16* | (2006.01) |
| *A47G 1/17* | (2006.01) |
| *A47G 1/20* | (2006.01) |
| *G01C 9/18* | (2006.01) |

(52) U.S. Cl.
CPC .......... *A47G 1/1613* (2013.01); *A47G 1/175* (2013.01); *A47G 1/205* (2013.01); *A47G 1/16* (2013.01); *A47G 1/1606* (2013.01); *A47G 1/17* (2013.01); *A47G 1/20* (2013.01); *G01C 9/18* (2013.01)

(58) Field of Classification Search
CPC ....... A47G 1/1606; A47G 1/1613; A47G 1/17
See application file for complete search history.

(56) References Cited

U.S. PATENT DOCUMENTS

| | | | |
|---|---|---|---|
| 3,117,353 A * | 1/1964 | Edwards | ............. E04F 13/0835 248/225.21 |
| 4,228,982 A | 10/1980 | Sellera | |
| 4,597,554 A | 7/1986 | James | |
| 4,606,526 A | 8/1986 | Rabinowitz | |
| 5,303,895 A | 4/1994 | Hart | |
| 5,961,090 A | 10/1999 | Parkin | |
| 6,286,802 B1 | 9/2001 | Munson et al. | |
| 6,322,039 B1 * | 11/2001 | De Luccia | ............. A47G 1/168 248/222.14 |
| 6,874,739 B1 | 4/2005 | Gregory | |
| 6,962,016 B1 | 11/2005 | Meyer | |
| 7,708,252 B2 | 5/2010 | Vander Berg et al. | |
| 7,802,769 B1 | 9/2010 | Lindsey | |
| 9,609,964 B1 * | 4/2017 | Munson | ............... A47G 1/1606 |

(Continued)

*Primary Examiner* — Anita M King
(74) *Attorney, Agent, or Firm* — Inventive Law Inc.; Jim H. Salter

(57) ABSTRACT

Various example embodiments disclosed herein include systems and methods for a wall hanging system. Example embodiments include: a wall mount formed with a longitudinally elongated body having upper and lower ends and a wall-facing surface, the upper end being formed with a longitudinal rail for engaging a channel in a frame member, the wall mount including an attachment mechanism to attach the wall mount to a wall surface, the wall mount further including an embedded leveling indicator to enable level attachment of the wall mount to the wall surface; and a frame including at least one frame member, each frame member being formed with a first longitudinal channel for engaging the rail of the upper end of the wall mount, each frame member being formed with a second longitudinal channel for engaging an edge of a wall hanging item inserted into the frame.

10 Claims, 18 Drawing Sheets

(56) References Cited

U.S. PATENT DOCUMENTS

| | | | |
|---|---|---|---|
| 2002/0125389 A1 | 9/2002 | Chu | |
| 2003/0038222 A1* | 2/2003 | Holmes | A47G 1/1606 248/475.1 |
| 2005/0072894 A1* | 4/2005 | Grant | A47G 1/1606 248/475.1 |
| 2006/0091271 A1* | 5/2006 | Nowak | A47B 95/008 248/225.21 |

* cited by examiner

Wall Hanging System

Wall Hanging System

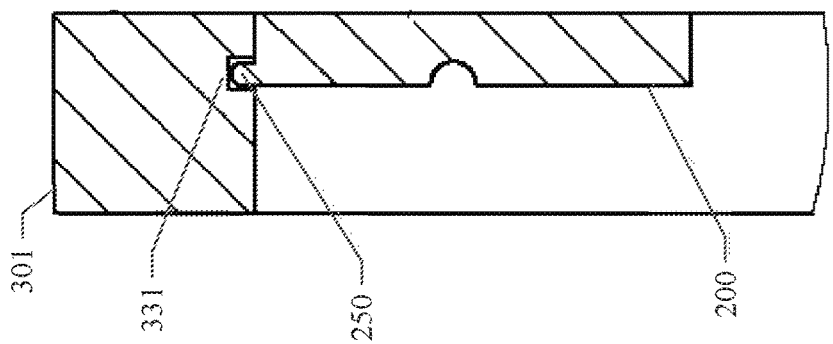
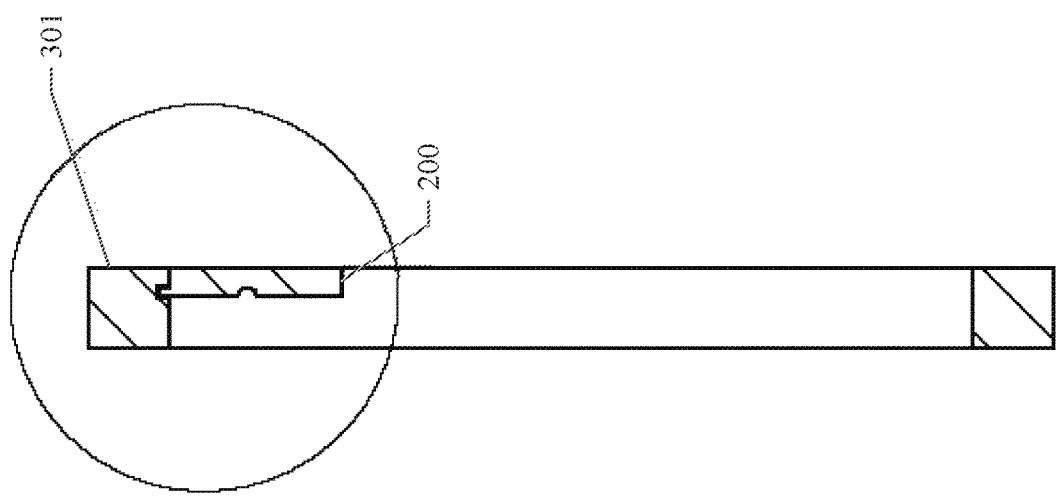
FIGURE 7

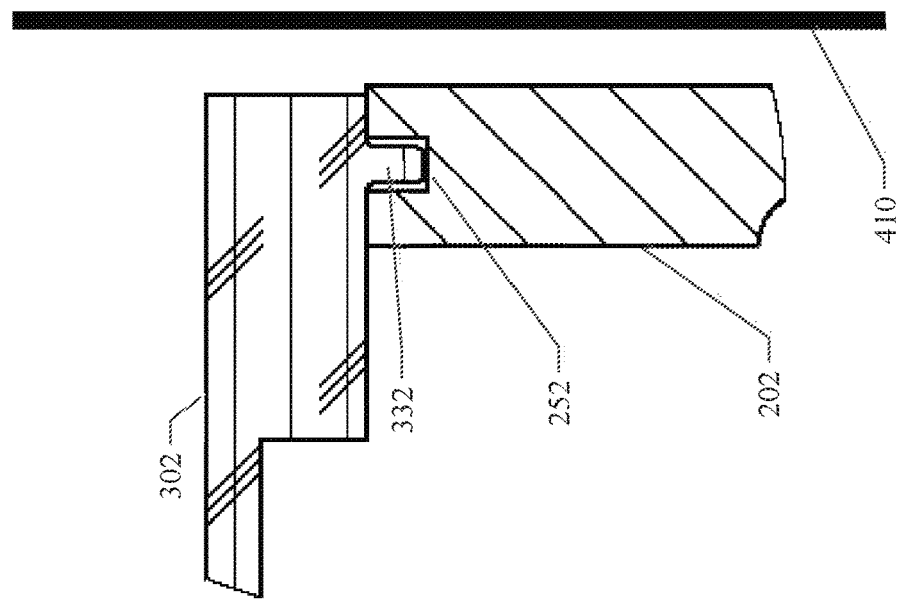
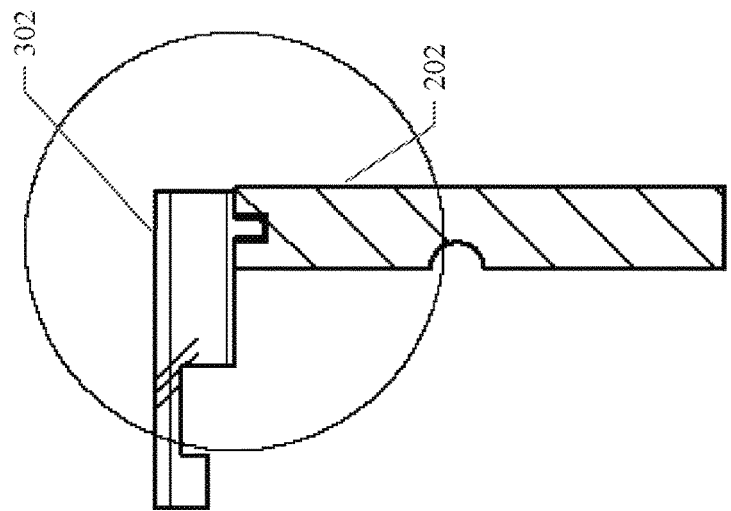
FIGURE 9

WALL HANGING SYSTEM

PRIORITY PATENT APPLICATION

This patent application is a continuation patent application drawing priority from U.S. patent application Ser. No. 14/668,694; filed Mar. 25, 2015. The entire disclosure of the referenced patent application is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2012-2015, Jeffery L. Jackson, All Rights Reserved.

BACKGROUND

Technical Field

Various example embodiments disclosed herein pertain generally to frames, and relate more particularly to wall hanging systems.

Related Art

Advances in photography, desktop publishing, and printing have resulted in an increase in the creation photos and visual art. Although the creation and printing of the photos and visual art is easier, more accessible, and less expensive, limitations still exist. One of the principal limitations is displaying the photos or visual art. Although there are frames in various sizes and shapes, these items can be difficult to properly mount and straighten on a wall at a desired location. Many conventional mounting systems require multiple items of equipment, such as, hammers, levels, drills, measuring tape, nails, hooks, and the like to mount an object, such as a frame, on a wall with proper levelling, spacing, and security. These mounting systems can be difficult and complicated to use by the target consumer group.

In an effort to simplify the spacing and alignment of conventional mounting systems, templates are often used to ensure the proper placement of mounting holes and hardware. Templates, while helpful, still require the consumer to use a separate level for proper orientation and require the use of a drill and wall anchor to affix the mounting hardware. Some known mounting systems require a mating component to be affixed to the item being hung and can cooperate with an additional bracket configured to hold a small spirit level.

BRIEF DESCRIPTION OF THE DRAWINGS

Reference will be made to example embodiments, which may be illustrated in the accompanying figures. These figures are intended to be illustrative, not limiting. Although the example embodiments are generally described in the context of particular configurations, it should be understood that it is not intended to limit the scope of the invention to these particular embodiments.

FIGS. 7 and 8 depict an embodiment of the wall hanging system configured for use with a stretch canvas frame that does not need a second channel in the frame to retain a wall hanging item.

FIGS. 9 and 10 illustrate an alternative embodiment of the wall hanging system wherein the frame portion is configured with a rail and the wall hanging mount portion is configured with a channel.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

Reference in the specification to "example embodiment," "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. The use of certain terms in various places in the specification is for illustration and should not be construed as limiting.

Overview

In various example embodiments, the wall hanging system disclosed herein comprises a wall hanging mount or wall mount in combination with a specially configured frame, which can be removably mounted or placed on the wall mount. The wall mount is a generally rectangular block, in a particular example embodiment, which includes an upper end formed with a longitudinal rail. The wall mount includes an attachment mechanism to secure the wall mount to a wall surface. The frame is specially configured with a longitudinal channel for engaging the rail of the wall mount when the frame is placed on the wall mount. In various embodiments, the frame is further configured to receive a picture (or portion thereof), art work (or portion thereof), or other display or functional items for hanging on a wall. As explained in more detail below, the wall hanging system allows ease of installation, low cost, flexibility, and creativity for displaying items on a wall.

Example Embodiments

Figure 1:
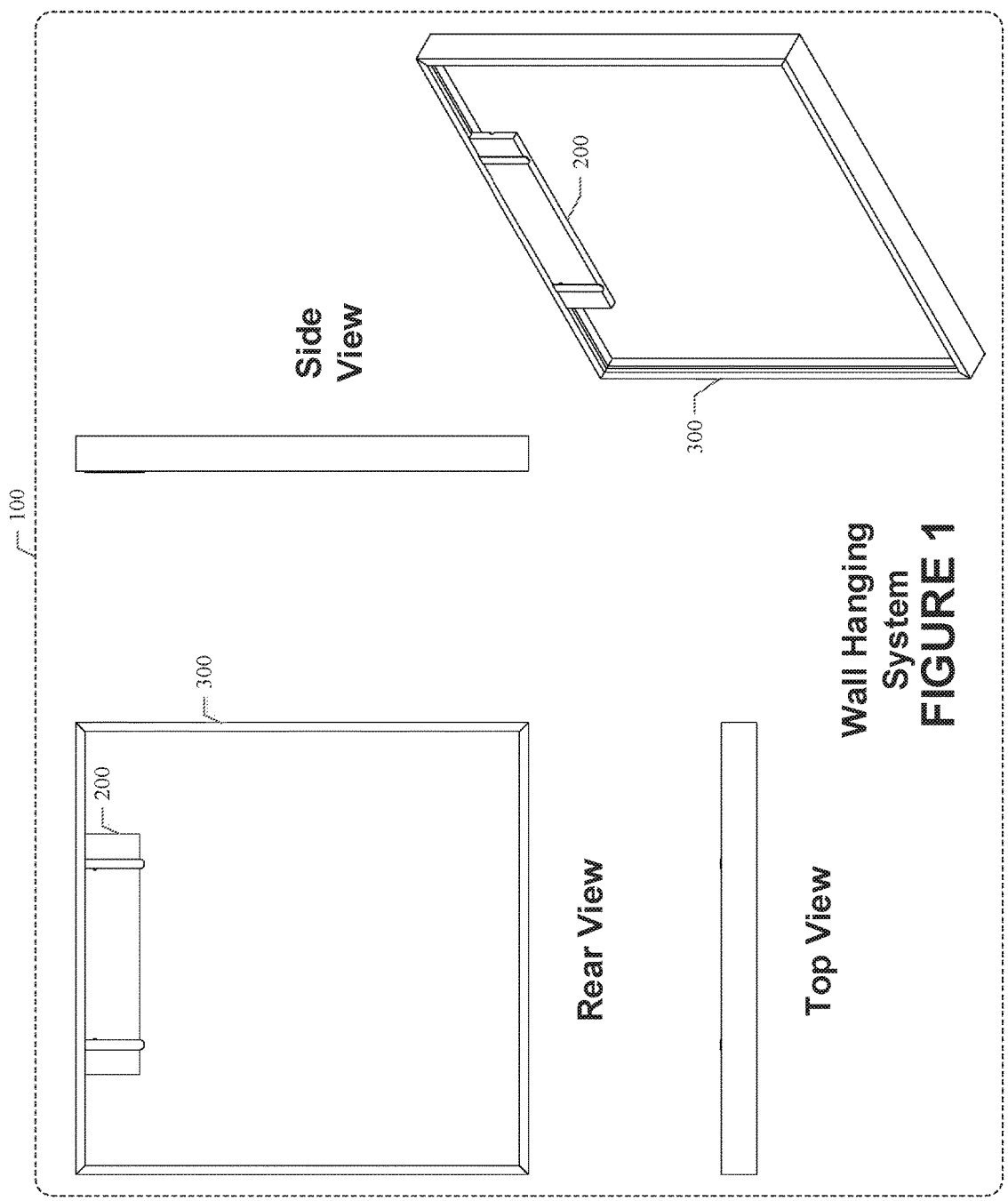
FIG. 1 depicts the rear, side, top, and rear perspective views of a wall hanging system according to example embodiments.

FIG. 1 depicts the rear, side, top, and rear perspective views of a wall hanging system 100 according to example embodiments. The wall hanging system 100 of an example embodiment comprises a wall hanging mount or wall mount 200 in combination with a specially configured frame 300, which can be removably mounted, placed, or otherwise engaged on the wall mount 200. The wall mount 200 is a generally rectangular block, in a particular example embodiment, which includes an upper end formed with a longitudinal rail as described in more detail below. The wall mount 200 includes an attachment mechanism to secure the wall mount 200 to a wall surface.

Referring still to FIG. 1, the wall hanging system 100 of an example embodiment further includes a frame 300, which is specially configured with a longitudinal channel for engaging the rail of the wall mount 200 when the frame 300 is placed on the wall mount 200. In various embodiments, the frame 300 is further configured to receive a picture (or portion thereof), art work (or portion thereof), or other display or functional items for hanging on a wall. Examples of other display or functional items include, but are not limited to, corkboard, whiteboard, glass, magnetic board, electronic display, shelves, lighting, and the like. As explained in more detail below, the wall hanging system 100 allows ease of installation, low cost, flexibility, and creativity for displaying items on a wall.

Figure 2:
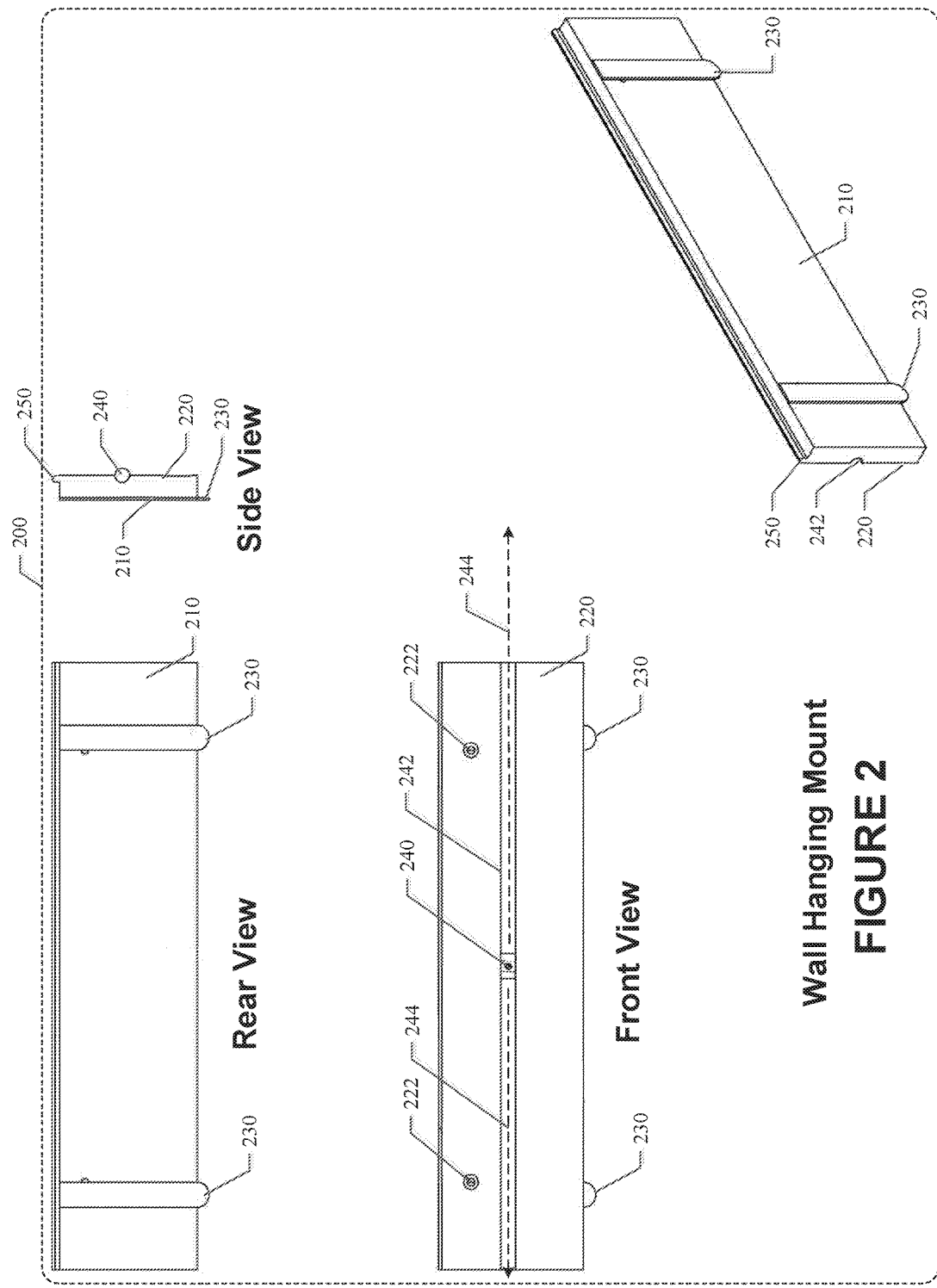
FIG. 2 depicts the rear, side, front, and rear perspective views of the wall hanging mount portion of the wall hanging system shown in FIG. 1 according to example embodiments.

FIG. 2 depicts the rear, side, front, and rear perspective views of the wall hanging mount portion or wall mount 200 of the wall hanging system 100 shown in FIG. 1 according to example embodiments. In an embodiment, the wall mount 200 is formed with a longitudinally elongated body having upper and lower ends and a flat wall-facing surface 210, the upper end being formed with a longitudinal rail 250 for engaging a channel in a frame member described in more detail below. In the example embodiment, the wall mount 200 includes an attachment mechanism for attaching the wall mount 200 to the surface of a wall. In a particular embodiment shown in FIG. 2, the attachment mechanism comprises adhesive strips 230 on the flat wall-facing surface 210 for removably attaching the wall mount 200 to a wall surface. Such removable adhesive strips in general, such as peel and stick adhesive strips, are well-known to those of ordinary skill in the art. In an alternative embodiment also shown in FIG. 2, the attachment mechanism can comprise screws, nails, rivets, or other wall penetrating device 222 on the flat room-facing surface 220 for attaching the wall mount 200 to a wall surface.

In the example embodiment shown in FIG. 2, the flat room-facing surface 220 of the wall mount 200 can be further formed with a longitudinal groove 242 in which a leveling indicator 240 can be embedded. The leveling indicator 240 can be a standard spirit level, bubble level, or other leveling indicator designed to indicate whether and when the wall mount 200 is oriented in a precisely horizontal (level) position relative to the floor. In the example embodiment, the embedded levelling indicator 240 provides a convenient way for a user to attach the wall mount 200 on the surface of a wall in a precisely horizontal (level) position. If adhesive strips 230 are used as an attachment mechanism, the levelling indicator 240 of the wall mount 200 can be used to orient the wall mount 200 in a precisely horizontal (level) position, with the longitudinal rail 250 on the upper edge, while the wall-facing surface 210 of the wall mount 200 is pressed against the surface of a wall. When this is done, the adhesive strips 230 will engage the wall surface and the wall mount 200, with the longitudinal rail 250 thereon, will be attached to the wall in a precisely level position. In this manner, the wall mount 200 can be quickly, precisely, and efficiently attached to a wall in a desired location in a level orientation without the need for tools, measuring devices, or other equipment. As will be described in more detail below, the wall mount 200 can be used to support a frame in which a picture, artistic work, or other displayable item can be inserted.

In an alternative embodiment of the wall mount 200, a laser pointer can be embedded into the groove 242 along with the levelling indicator 240. Such laser pointers, laser levelling devices, or other standard laser pointing devices are well-known to those of ordinary skill in the art. The laser pointer can be oriented so the laser beam 244 emitted therefrom is directed longitudinally parallel to the wall mount 200 and parallel to the groove 242 and the room-facing surface 220 as shown in FIG. 2. In this manner, when the wall mount 200, with the laser pointer therein, is attached to a wall in a precisely level position as described above, the laser beam 244 will be directed in a precisely level orientation to each side (right and left) of the wall mount 200. As a result, a second wall mount or a different wall hanging can be accurately positioned adjacent to the wall mount 200 relative to the laser beam 244. Thus, an example embodiment enables the easy and precise positioning of a wall mount on a wall surface and also enables the easy and precise positioning of adjacent wall hangings.

Figure 3:
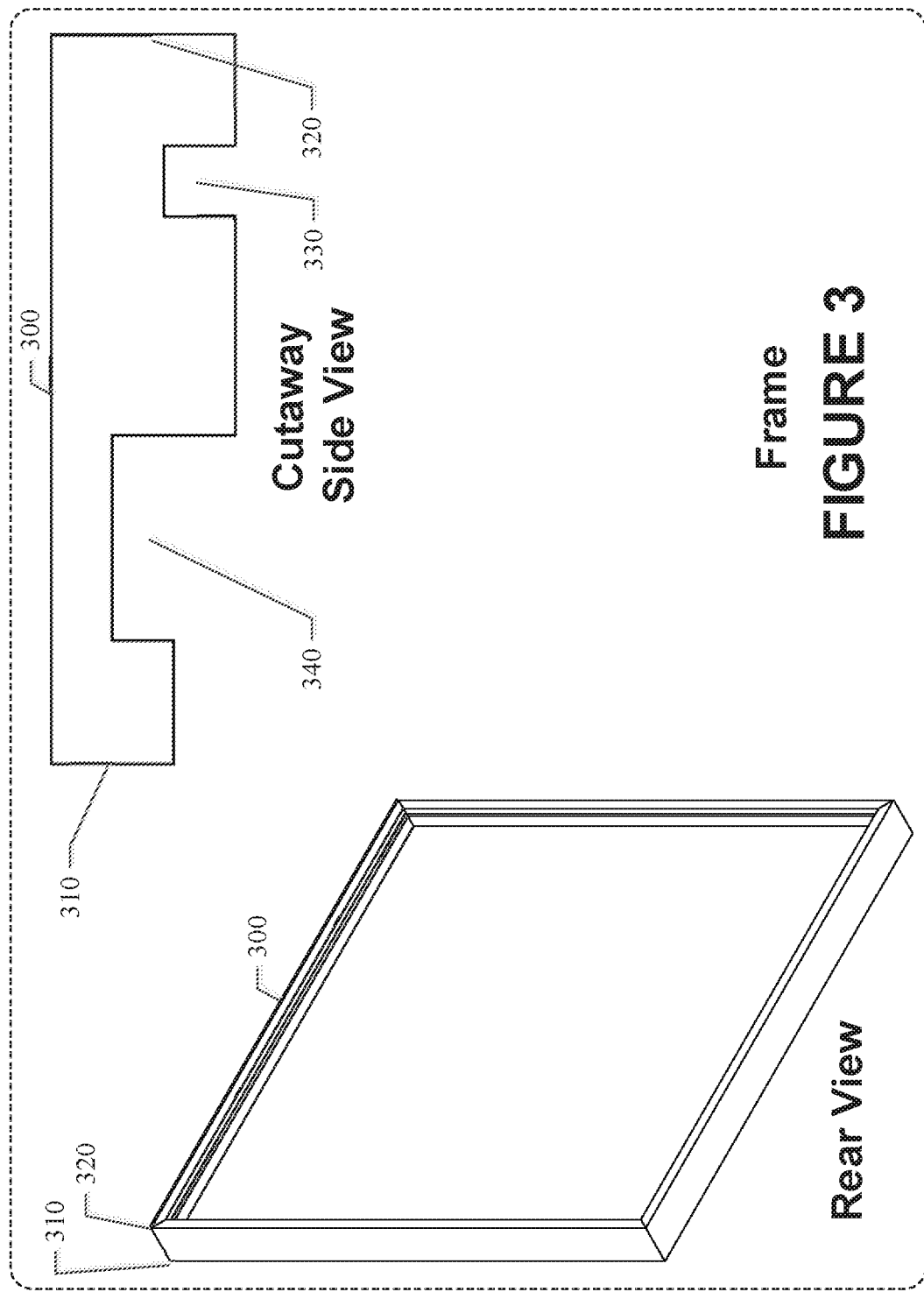
FIG. 3 depicts the rear perspective and cutaway side views of the frame portion of the wall hanging system shown in FIG. 1 according to example embodiments.

FIG. 3 depicts the rear perspective and cutaway side views of the frame portion or frame 300 of the wall hanging system 100 shown in FIG. 1 according to example embodiments. In the example embodiment, the frame 300 can be a generally rectangular shape, or other polygon shape, having a plurality of sides or frame members. Each side or frame member can be constructed in a similar fashion. The cutaway side view shown in FIG. 3 illustrates the cross-section configuration of each of the sides or frame members of the frame 300. In the example embodiment, each side has a room-facing edge 310 and a wall-facing edge 320. The sides are further configured to include two channels running longitudinally and parallel to the side. The first channel 330, nearest to the wall-facing edge 320, is configured to engage the rail 250 of the upper end of the wall mount 200. The second channel 340, nearest to the room-facing edge 310, is configured to engage and retain an edge of a picture backing surface or other surface of a wall hanging item inserted into the frame 300. It will be apparent to those of ordinary skill in the art in view of the disclosure herein that the shapes and dimensions of the channels 330 and 340 can be varied to accommodate particular types of wall hangings and corresponding wall mounts 200.

Figure 4:
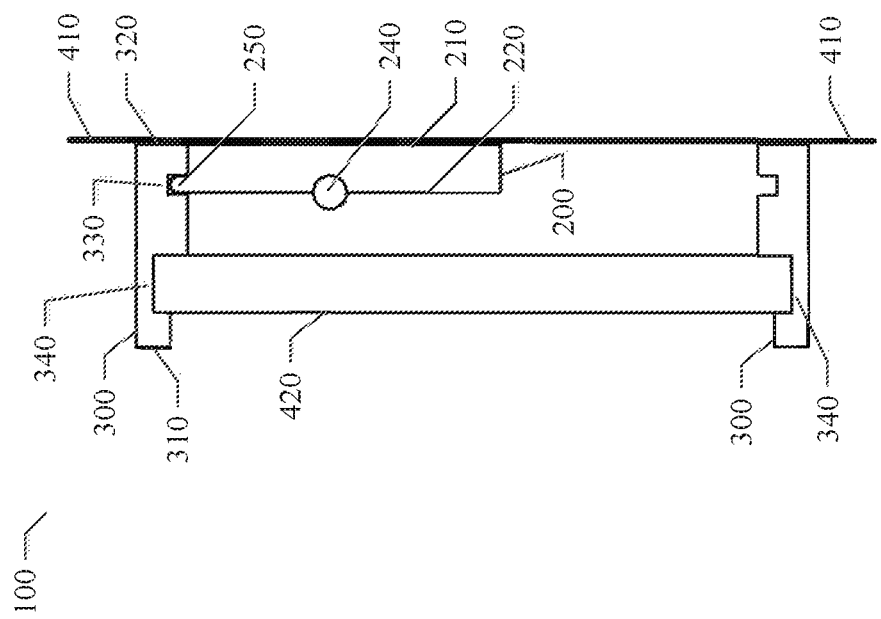
FIG. 4 depicts a side view of the wall hanging system showing the frame portion engaged on the wall hanging mount portion according to example embodiments.

FIG. 4 depicts a side view of the wall hanging system 100 showing the frame portion 300 engaged on the wall hanging mount portion 200 according to example embodiments. The view of the wall hanging system 100 illustrated in FIG. 4 is shown with sides of the frame 300 missing to provide clarity in the illustration. As shown, a wall hanging item 420 has been inserted into the second channel 340, which serves to retain the wall hanging item 420 within the frame 300. As also shown in FIG. 4, the wall mount 200 has been attached to the surface of the wall 410 in a precisely horizontal position by virtue of the levelling indicator 240 as described above. Because the wall mount 200 has been placed on the wall 410 in a precisely horizontal position, the rail 250 on the upper end of the wall mount 200 is also configured in a precisely horizontal orientation. As a result, the frame 300, with the wall-facing edge 320 nearest to the wall 410, can be placed on the upper end of the wall mount 200 to cause the rail 250 of the wall mount 200 to engage the first channel 330 of the frame 300. Given the attachment of the wall mount 200 to the wall 410 and the engagement of the rail 250 with the first channel 330, the wall mount 200 serves to support the frame 300 with the wall hanging item 420 contained therein. Because the wall mount 200 has been attached to the surface of the wall 410 in a precisely horizontal position as described above, the frame 300 will also hang on the wall mount 200 in a precisely horizontal position. Thus, the wall hanging system 100 of an example embodiment enables a user to hang items on a wall with an easy and accurate system, which does not require tools or special expertise. Moreover, because the first channel 330 of the frame 300 extends across the entire frame side and the rail 250 of the wall mount 200 extends across the entire upper edge of the wall mount 200, the frame 300 can be moved laterally (right or left and parallel to the wall 410) to adjust the position of the frame 300 while the frame 300 is supported by the wall mount 200. This feature of the various embodiments enables the user to adjust the placement of the wall hanging item 420 without having to move the wall mount 200. Additionally, as described above, given the laser pointer inserted in the wall mount 200, the user can also conveniently position adjacent wall hanging items using the laser beam 244 to accurately determine positioning for the adjacent items. Thus, the wall hanging system 100, in various embodiments described herein, allows ease of installation, low cost, flexibility, and creativity for displaying items on a wall.

Figure 5:
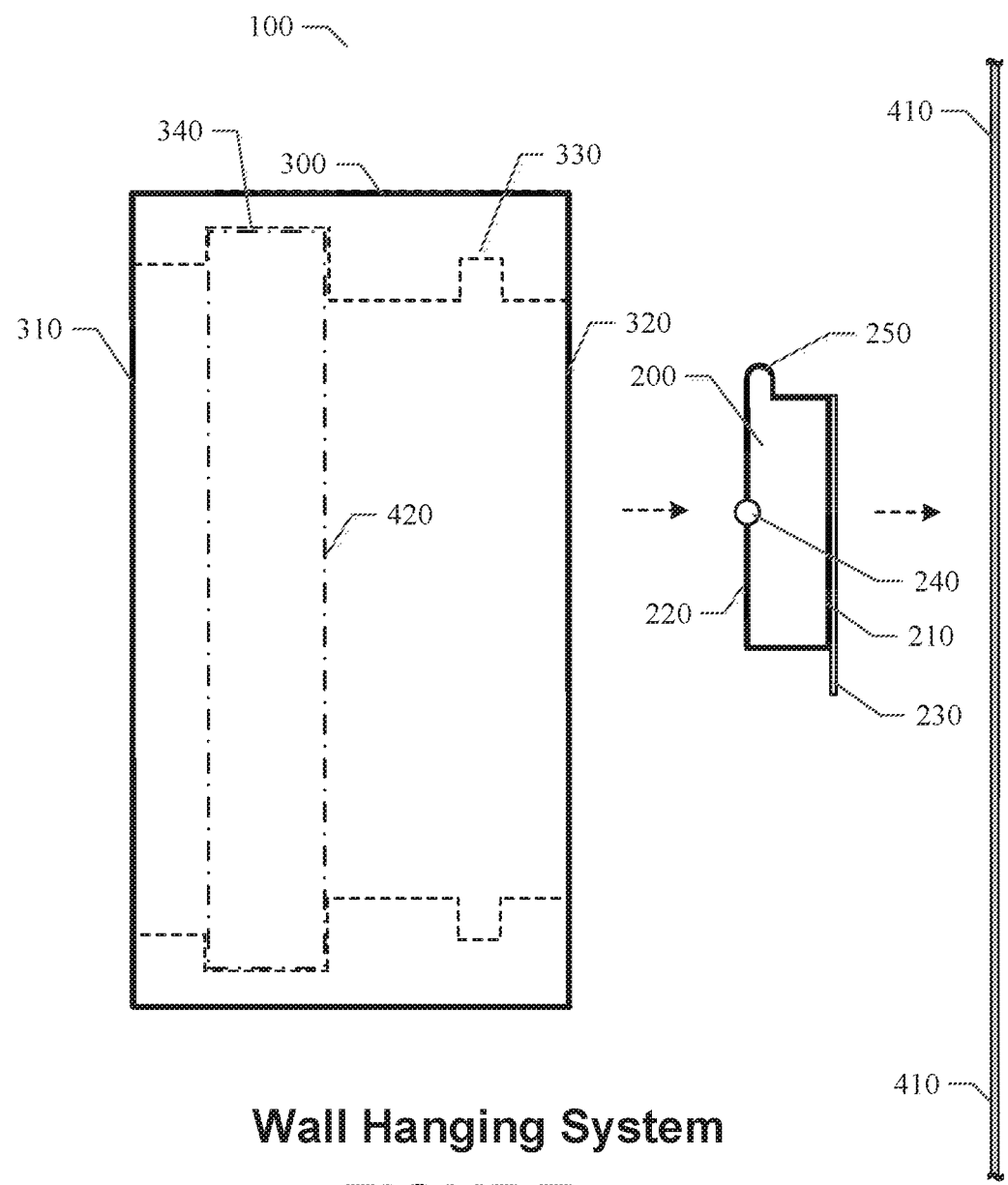
FIG. 5 depicts another side view of the wall hanging system showing the frame portion disengaged from the wall hanging mount portion according to example embodiments.

FIG. 5 depicts another side view of the wall hanging system 100 showing the frame portion 300 disengaged from the wall hanging mount portion 200 according to example embodiments. The view of the wall hanging system 100 illustrated in FIG. 5 is shown with elements hidden from view drawn in dashed lines to provide clarity in the illustration. As shown, a wall hanging item 420 has been inserted into the second channel 340 of frame 300, which serves to retain the wall hanging item 420 within the frame 300. As described above, the frame 300 includes the first channel 330 to engage the rail 250 of wall mount 200. In the example embodiment shown in FIG. 5, the wall mount 200 has not yet been attached to the wall 410.

In a process for using the wall hanging system 100 of an example embodiment, the first step is to attach the wall mount 200 to the wall 410 using the attachment mechanism 230 as described above. The wall mount 200 can also be attached to the wall 410 using screws, nails, rivets, or other wall penetrating device. As part of the wall mount 200 attachment step, the wall mount can be precisely positioned in a horizontal orientation using the levelling indicator 240. Upon completion of the first step, the wall mount 200 will be attached to the wall 410 in a precisely horizontal orientation as shown in FIG. 6.

Figure 6:
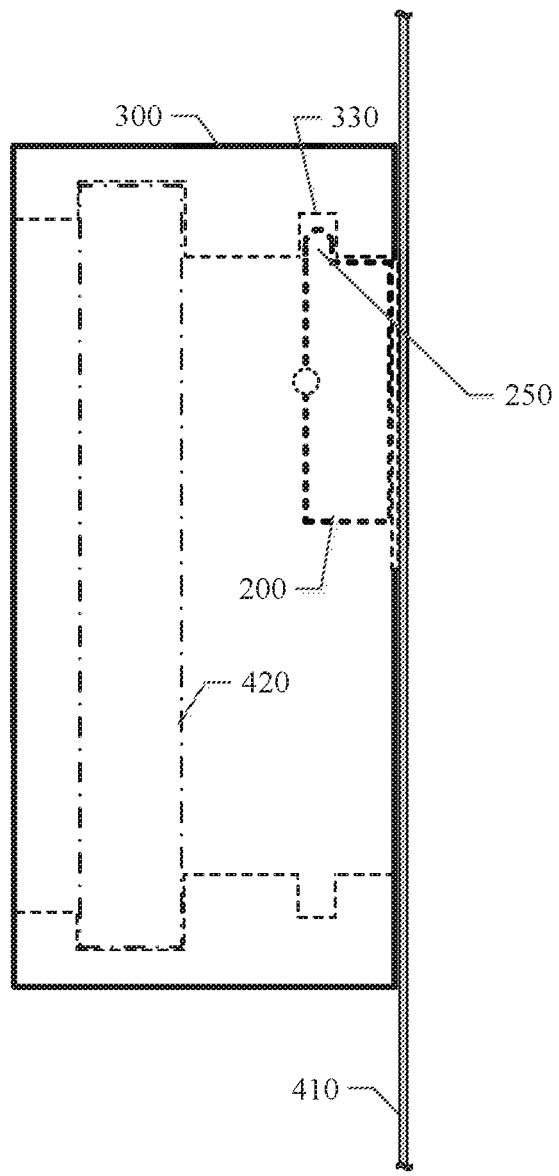
FIG. 6 depicts another side view of the wall hanging system showing the frame portion engaged on the wall hanging mount portion according to example embodiments.

Referring again to FIG. 5, the second step in a process for using the wall hanging system 100 is to mount the frame 300 on the wall mount 200 so the first channel 330 of frame 300 engages the rail 250 of the wall mount 200 as shown in FIG. 6. FIG. 6 depicts another side view of the wall hanging system 100 showing the frame portion 300 engaged on the wall hanging mount portion 200 according to example embodiments. As part of the frame 300 mounting step, the frame 300 can be adjusted laterally by moving the frame 300 left or right on the rail 250 of wall mount 200. Because the wall mount 200 has been attached to the surface of the wall 410 in a precisely horizontal position as described above, the frame 300 will also hang on the wall mount 200 in a precisely horizontal position. Thus, the wall hanging system 100 of an example embodiment enables a process for a user to hang items on a wall using a method that is easy and accurate.

Figure 8:
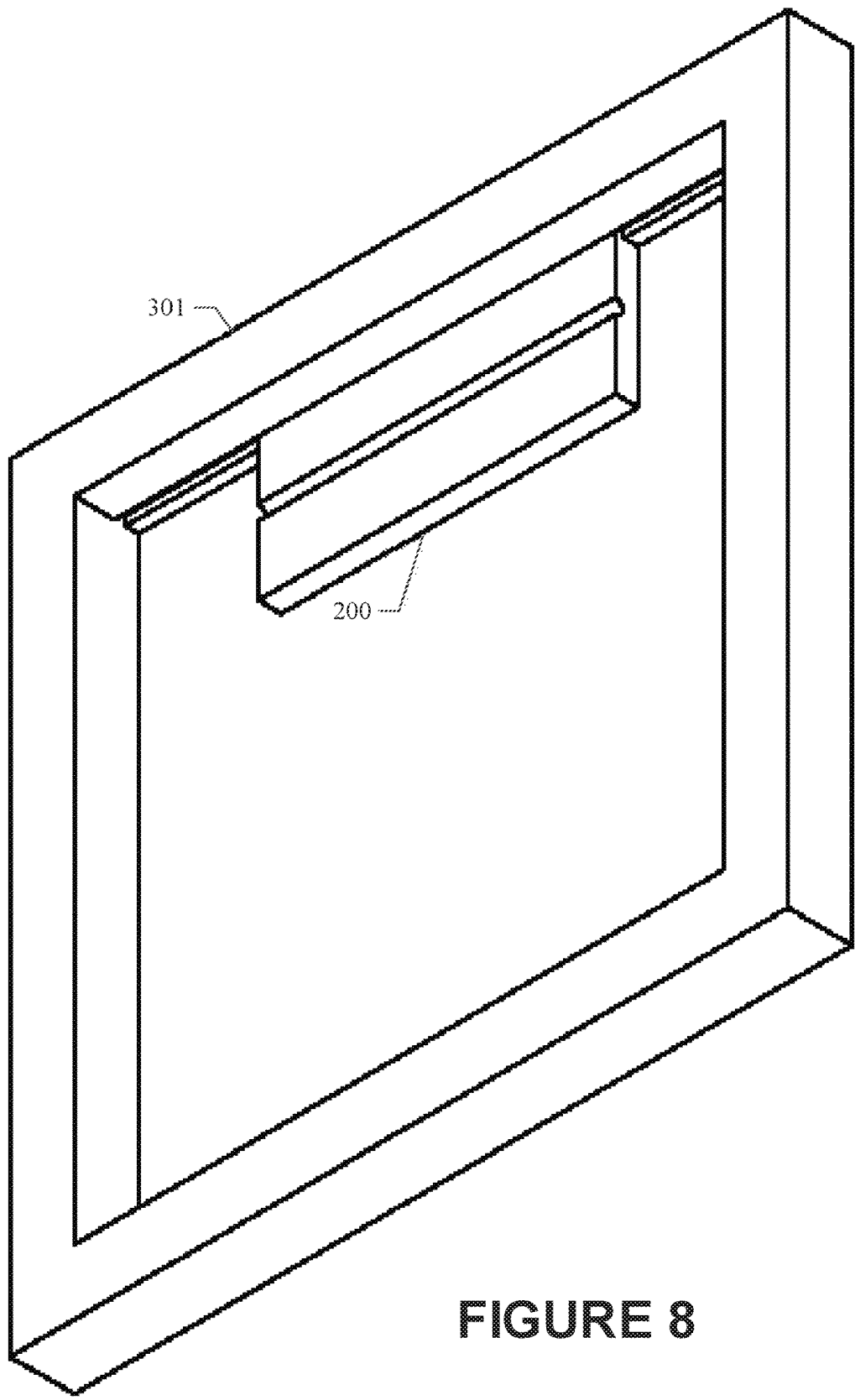

FIGS. 7 and 8 depict an embodiment of the wall hanging system configured for use with a stretch canvas (or similar type) frame 301 that does not need a second channel in the frame to retain a wall hanging item. In this example embodiment as shown in FIG. 7, the frame 301 includes a single channel 331 configured to engage the rail 250 of wall mount 200 as described above. FIG. 8 illustrates how the frame 301 can be hung on the wall mount 200 as described above. A wall hanging item, such as a canvas or fabric item, can be wrapped around frame 301 and stapled or otherwise attached to the frame 301. In this embodiment, the frame 301 does not need a second channel in the frame 301 to retain the wall hanging item.

Figure 10:
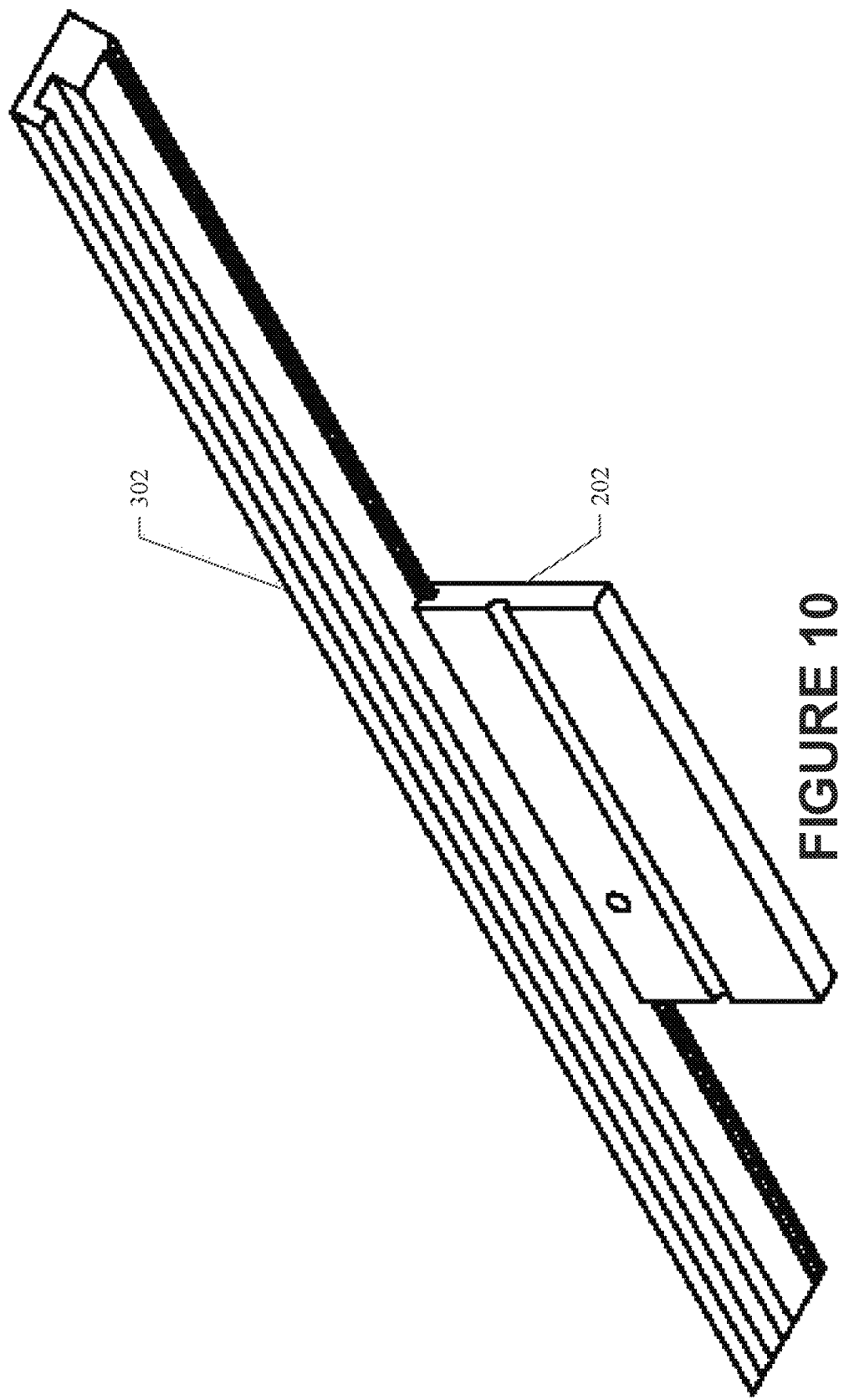

FIGS. 9 and 10 illustrate an alternative embodiment of the wall hanging system wherein the frame portion 302 is configured with a rail 332 and the wall hanging mount portion 202 is configured with a channel 252. Referring again to FIG. 6, an example embodiment of the wall hanging system is illustrated and described above wherein the frame 300 is configured with a channel 330 to engage a rail 250 in the wall mount 200 when the frame 300 is hung on the wall mount 200. In the alternative embodiment shown in FIGS. 9 and 10, the configuration of the channel and rail is reversed relative to the frame and the wall mount. In the embodiment as shown in FIG. 9, the frame 302 includes frame rail 332 and the wall mount 202 includes wall mount channel 252. In this alternative configuration, the frame 302 can still be hung on the wall mount 202 and the frame rail 332 can be retained by the wall mount channel 252. As described above, this configuration also allows the frame 302 to be moved laterally (left or right) to adjust the position of the frame 302 while the frame 302 is resting on the wall mount 202. FIG. 10 illustrates a portion of the frame 302 resting on the wall mount 202 with the frame rail 332 retained or engaged in the wall mount channel 252.

Figure 11:
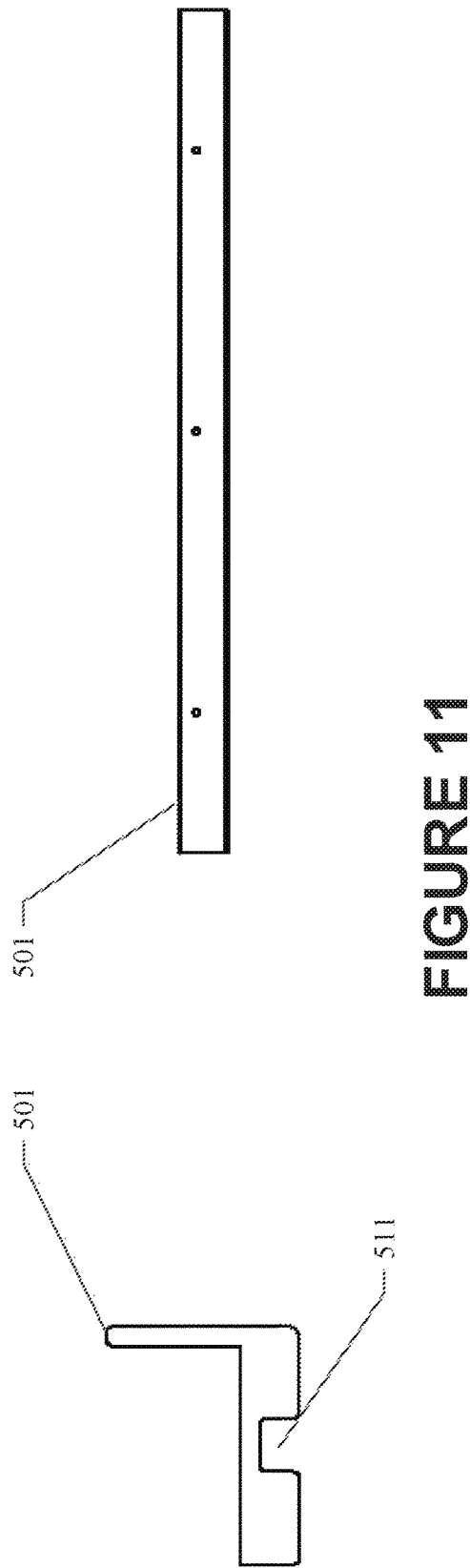
FIGS. 11 through 14 illustrate an embodiment of a retrofit frame adapter for use with the wall hanging system according to example embodiments.
Figure 12:
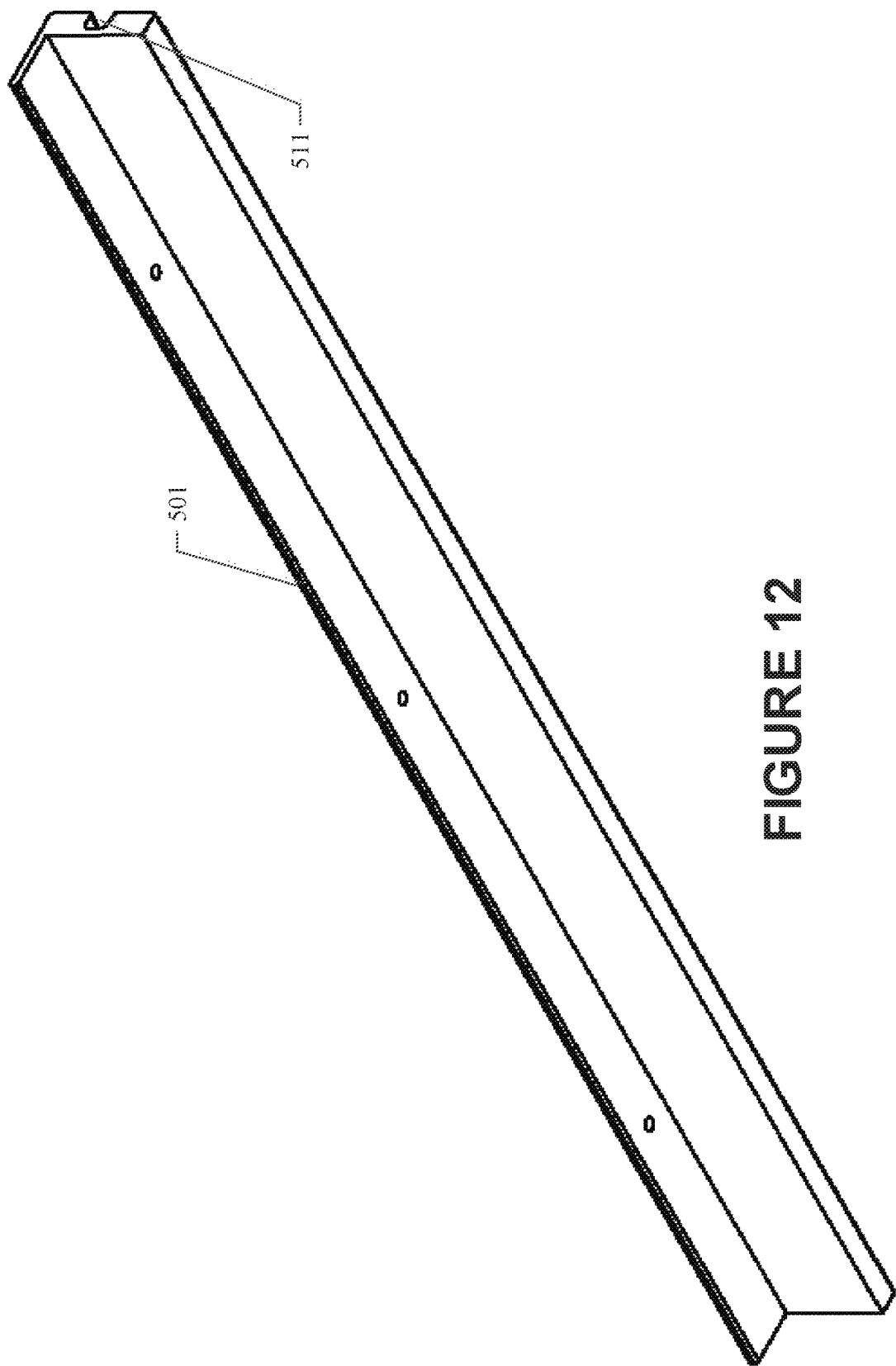
Figure 13:
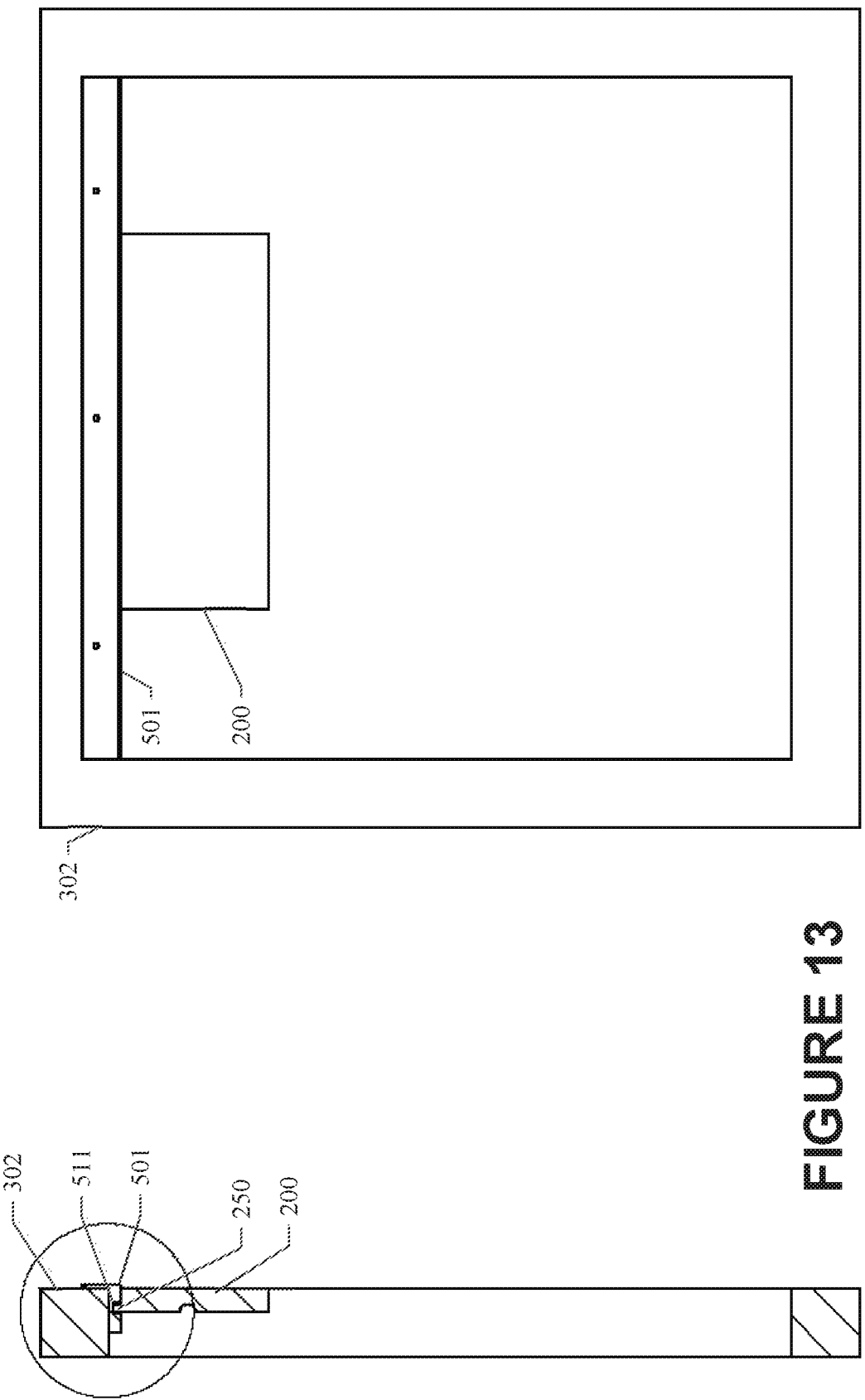
Figure 14:
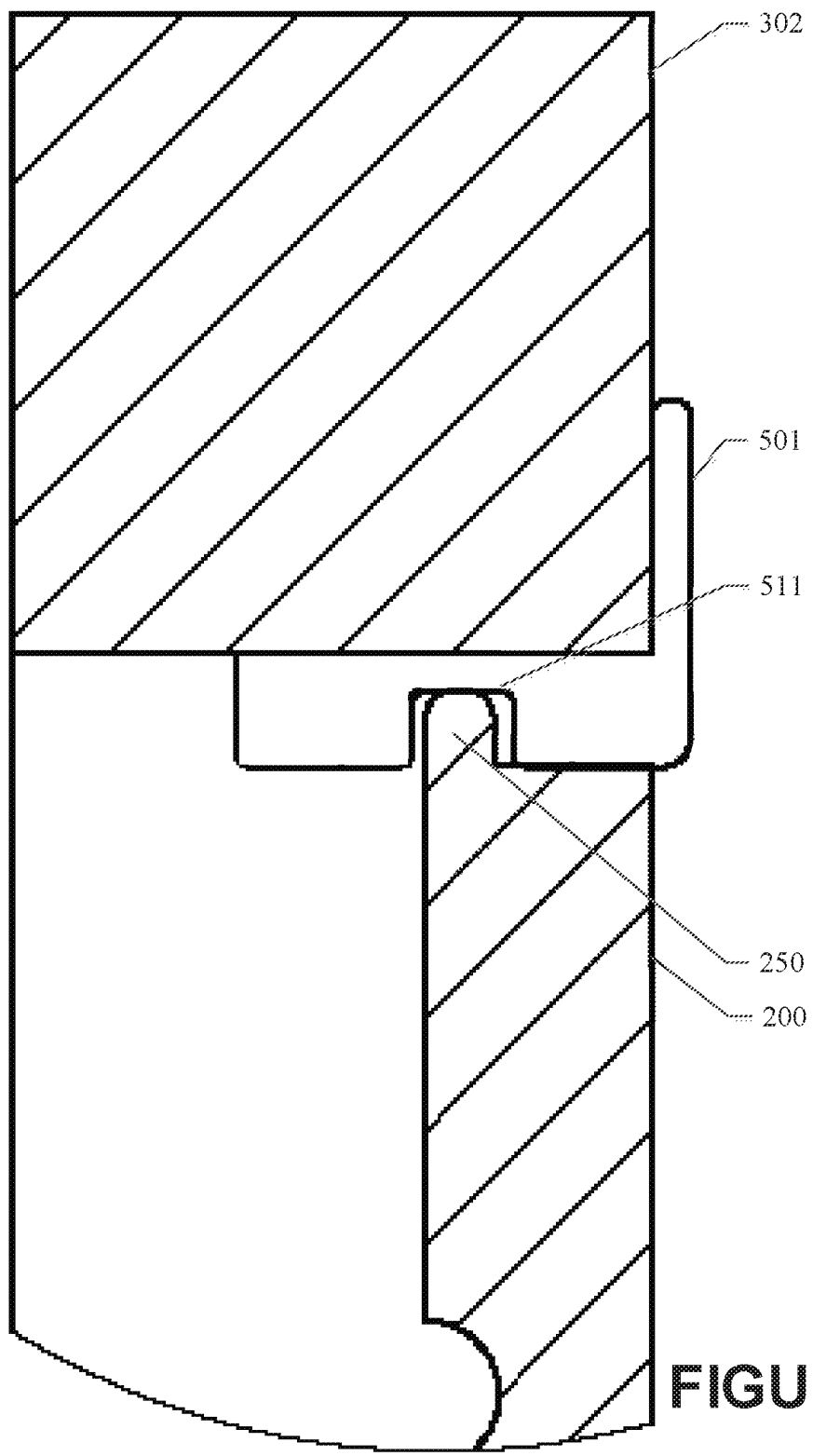

FIGS. 11 through 14 illustrate an embodiment of a retro-fit frame adapter 501 for use with the wall hanging system according to example embodiments. In some cases, a particular frame may not be configured with a channel to engage the rail of the wall mount as described herein. In these situations, the retro-fit frame adapter 501 is provided to retro-fit the frame with a channel that can engage the rail of the wall mount. In an example embodiment, the retro-fit frame adapter 501 can be formed in an elongated L-shaped configuration in cross-section as shown in FIG. 11. In the example embodiment shown, the retro-fit frame adapter 501 includes a channel 511 configured to engage a rail 250 of a wall mount 200. FIG. 12 shows a perspective view of an example embodiment of the retro-fit frame adapter 501. As shown in FIG. 13, the retro-fit frame adapter 501 can be attached to a corner of a frame 302 portion that does not have a channel. By virtue of the L-shape of the retro-fit frame adapter 501, the retro-fit frame adapter 501 can be attached to the frame 302 portion so that an underside of the frame 302 portion is retro-fitted with the channel 511 of the retro-fit frame adapter 501 as shown in FIG. 13. As shown in FIG. 14, once attached to the frame 302, the retro-fit frame adapter 501 and the channel 511 therein, can engage with the rail 250 of the wall mount 200. In this manner, a frame that does not have a channel to engage the rail of the wall mount can be retro-fitted to work with the wall mount 200. As a result, any frame can be used with the wall hanging system as described herein.

Figure 15:
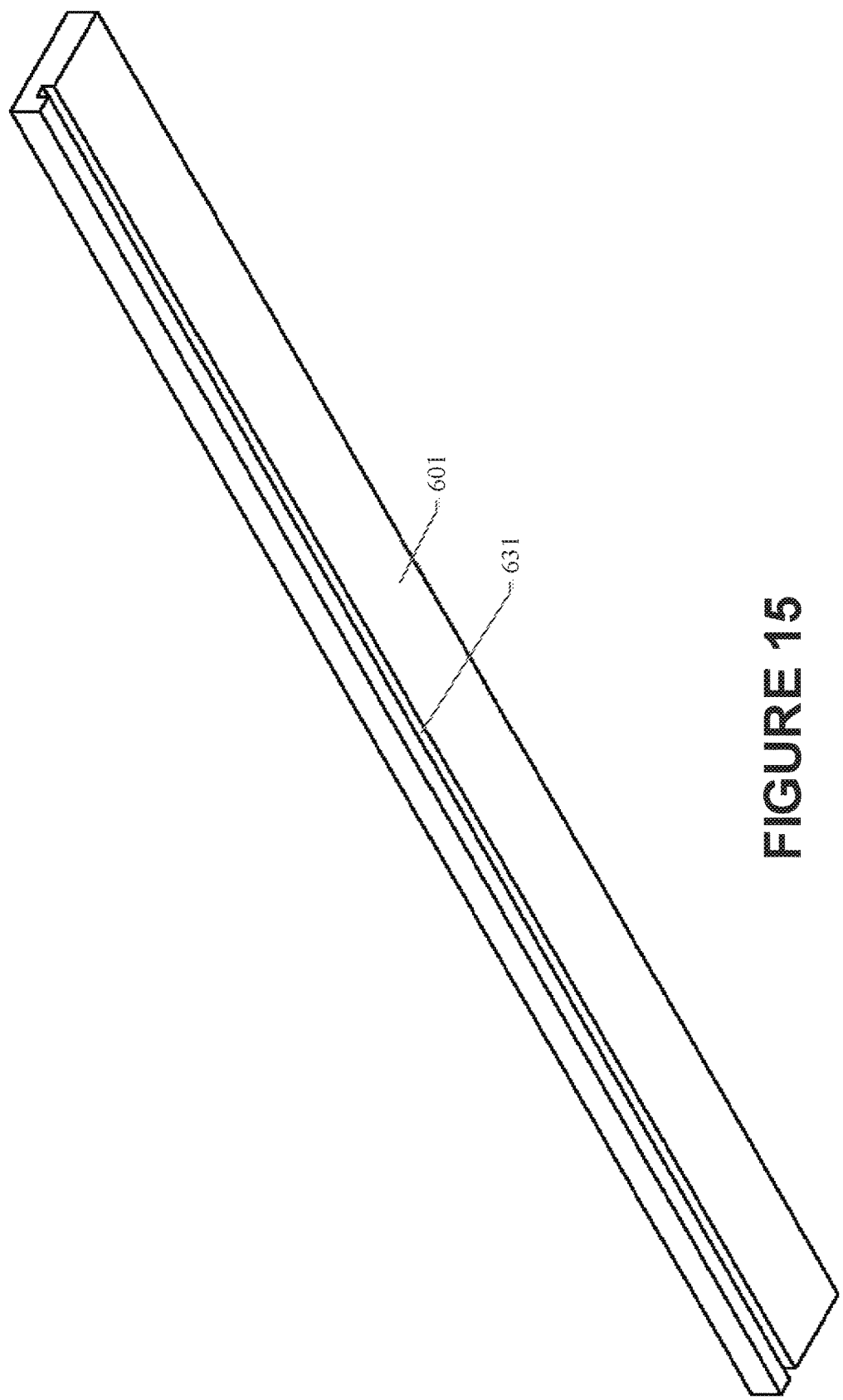
FIGS. 15 through 18 illustrate an embodiment of a frame hanging tool for use with the wall hanging system according to example embodiments.

FIGS. 15 through 18 illustrate an embodiment of a frame hanging tool 601 for use with the wall hanging system according to example embodiments. It is often desired to hang two frames, one vertically above the other, so the frames are minimally separated or even touching at the bottom portion of the upper frame and the top portion of the lower frame. Unfortunately, it is very difficult to hang frames in this arrangement without exhaustive trial and error. For this reason, the frame hanging tool 601, as disclosed herein, can be used with the wall hanging system according to example embodiments to solve this problem. As shown in FIG. 15, the frame hanging tool 601 can be an elongated member configured with a channel 631 to engage the rail 250 of a wall mount 200 as described herein.

Figure 16:
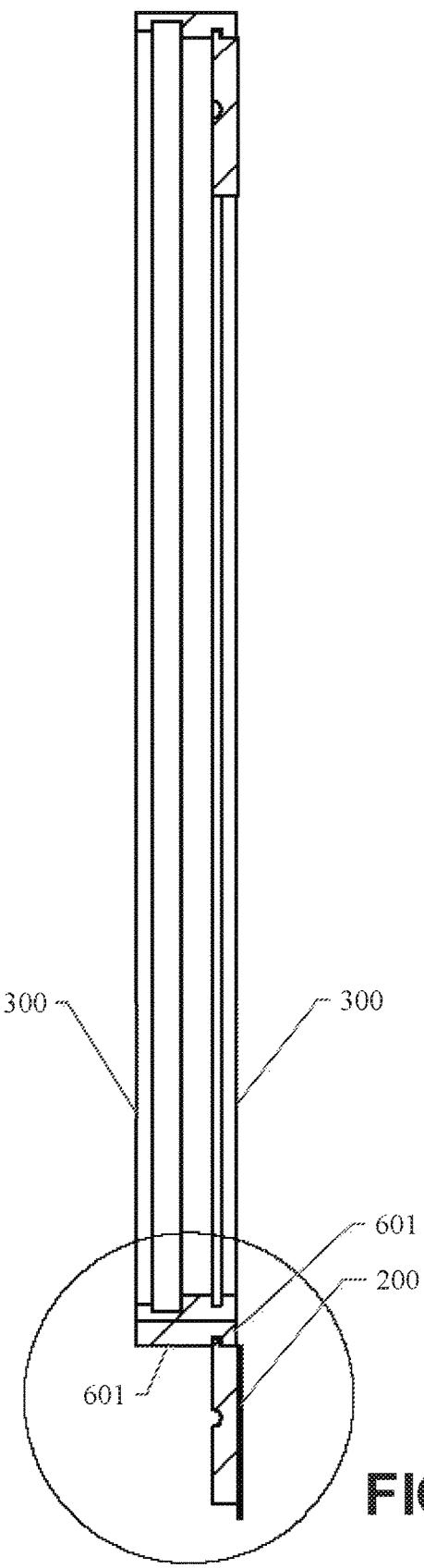
Figure 17:
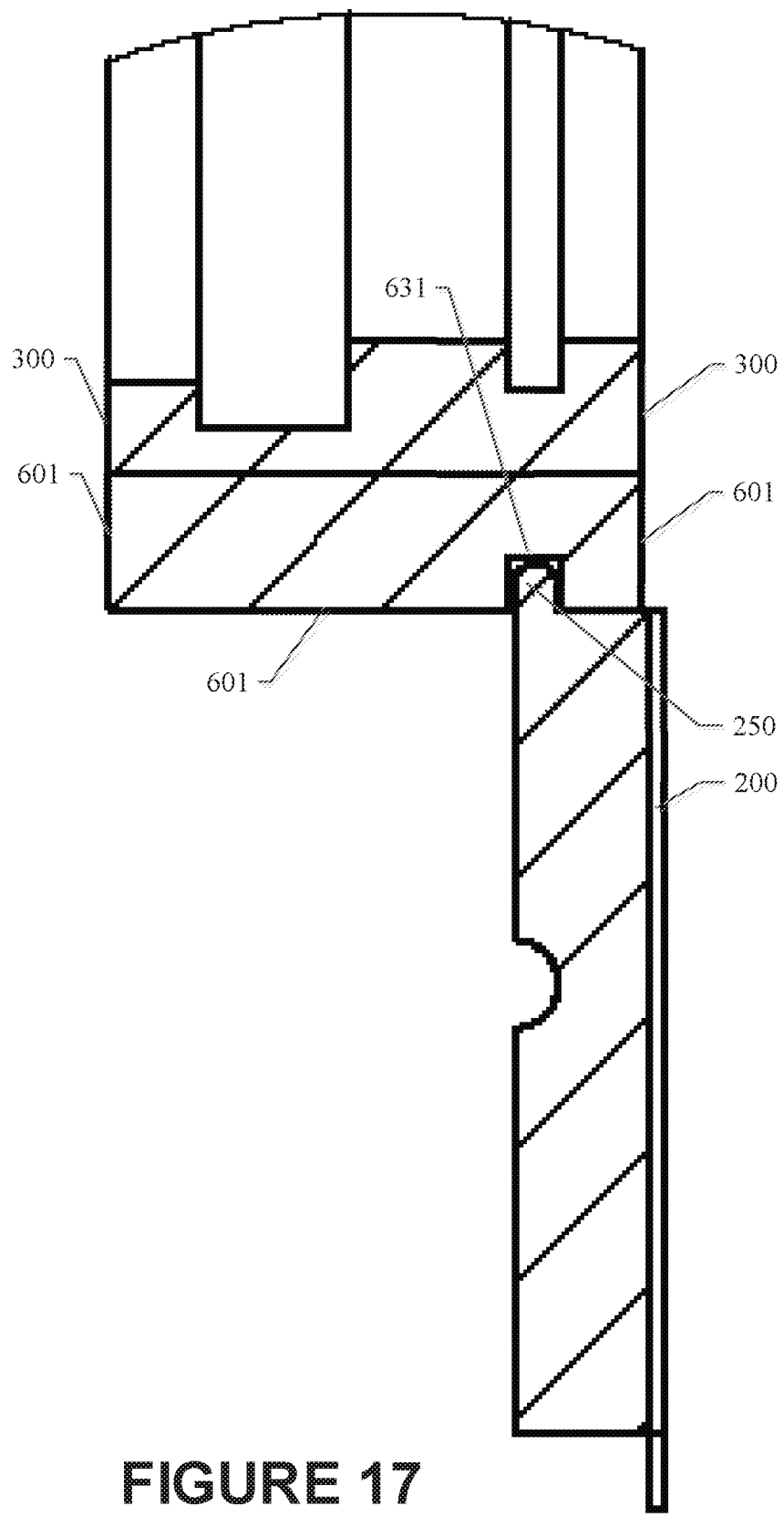
Figure 18:
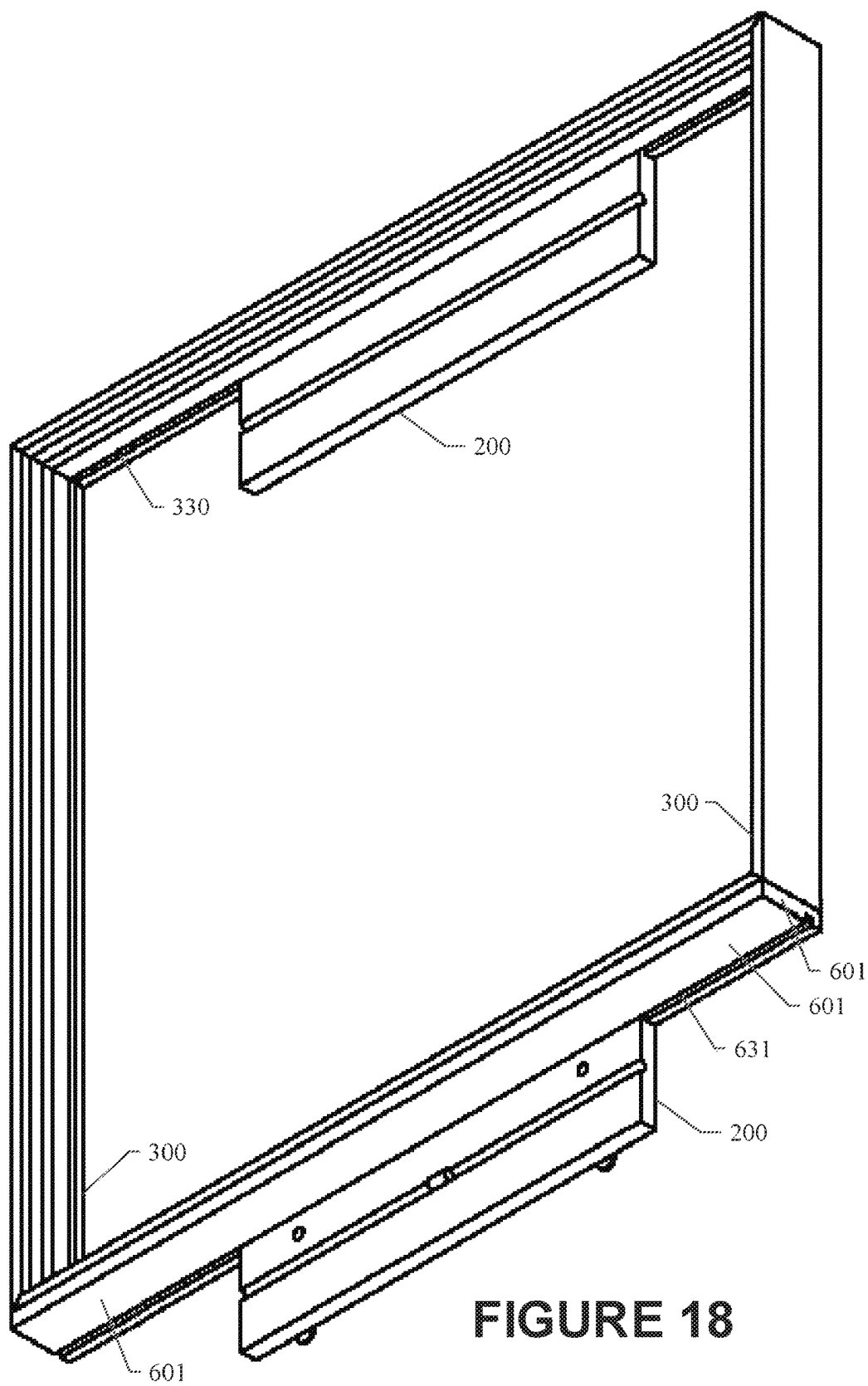

As shown in FIG. 16, an upper frame 300 can be hung on a wall in a desired location using a first (upper) wall mount as described above. Then, the frame hanging tool 601 of an example embodiment can be placed on the bottom portion of the upper frame 300 as shown in FIG. 16. Next, a second (lower) wall mount 200 can be inserted into the frame hanging tool 601 with the rail 250 of the second wall mount 200 engaging the channel 631 of the frame hanging tool 601 as shown in FIGS. 17 and 18. In this configuration, the second wall mount 200 will be positioned in the exact proper location on the wall for placement of the lower frame. Thus, the second wall mount 200 can be attached to the wall at this position as described above. Then, the upper frame 300 and the frame hanging tool 601 can be removed. The lower frame can be hung on the second wall mount 200 and the upper frame 300, without the frame hanging tool 601, can be hung on the first wall mount. As a result, the upper frame 300 will be positioned directly above the lower frame as desired. Thus, the frame hanging tool 601 of an example embodiment simplifies the hanging and arrangement of multiple frames.

In various example embodiments, the wall mount 200 and the frame 300 are shown in the figures as rectangular objects, but other regular and irregular shapes may be used. In various embodiments, the wall mount 200 and the frame 300 may be constructed of wood, metal, composite, plastic, or other suitable material or materials. As an added feature of the various embodiments, the wall mount 200 and the frame 300 may be constructed of the same type of material, thus reducing manufacturing and inventory costs. In example embodiments, the frame 300 may be injection molded to allow for a substructure backing of a wall hanging item 420 to be precisely made both to fit the frame 300 and to provide structural support. In various embodiments, different substructure backings may be used, including but not limited to corrugated backing, cardboard, cardstock, wood, composites, metal, plastic, acrylic, and foam core. In various embodiments, a photo, artistic work, or other visual display element may be attached to the substructure backing to form the wall hanging item 420. Alternatively, the photo, artistic work, or other visual display element may be positioned between substructure elements, such as a transparent material and another backing material. In yet other embodiments, the photo, artistic work, or other visual display element may be positioned behind a transparent or partially transparent material only. In such embodiments, the transparent or partially transparent material acts as the substructure backing material. In embodiments, the photo, artistic work, or other visual display element may be attached via an adhesive material to the transparent or partially transparent material, a backing, a backing substructure, or some combination thereof. In embodiments, the photo, artistic work, or other visual display element may be printed directly on the transparent or partially transparent material, a backing, a backing substructure, or some combination thereof. In embodiments, the substructure backing board may be configured to be double-sided, reversible, or both.

It should also be noted that there are different ways to offer the frames 300 other than different sizes, shapes, materials, and colors. In embodiments, the frames 300 can be designed to have the images, or other wall hanging item, loaded from the backside of the frame 300. In alternative embodiments, the images can be configured into a box-top configuration. For example, in various embodiments, the images may be printed flat, but after printing, the images are cut such that the four sides can be folded down at 90 degrees (flapped). The leading edges of the image, the edges which were folded down, are fit into matching grooves designed into the front of the frame. The grooves are deep enough and provide enough compressive force to provide retention to the frame edge as it is forced into it. In embodiments, an individual image has consistent flaps, but between images the flap lengths may vary. In embodiments, an individual image may have different flap lengths may vary to create different angled front surfaces.

Examples of other wall hanging items, display items, or functional items include, but are not limited to, corkboard, whiteboard, glass, magnetic board, electronic display, shelves, lighting, and the like. For example, in embodiments, all or part of the frame 300 may be made of a semi-translucent material with added backlighting. In another example, the frame 300 could have whiteboards and/or magnetic boards thereby allowing for a user to custom configure the frame into a "message center." In further embodiments, the wall hanging system 100 allows for people to have custom "friend-center boards" or topic-specific boards or sections.

In embodiments, the wall hanging system 100 may function in conjunction with an application to project an image according to the frame configuration desired by the end user. The image may be printed by a service or by a user's printer and put into the wall hanging system 100.

In embodiments, one or more of the displayed images may be printed or include an augmented reality code. A person may use a laptop, phone, or other computing device to augment their viewing of the framed display using the augmented reality code. This can allow a user to link multimedia content to an image. For example, music or a video may be linked to the display of a picture. Interactive content may also be linked to the framed display.

It should be noted that the wall hanging system 100 offers a variety of configurations and combinations and may be used for frames, notices, signs, displays, and the like. In embodiments, the wall hanging system 100 may be configured for indoor or outdoor use. It shall also be noted that another benefit of the wall hanging system 100 is that it can be easily changed, re-configured, and/or stored. The wall hanging system 100 of various embodiments provides a strong and aesthetically appealing frame for configuring and displaying visual content —but at very affordable costs and with very convenient and easy installation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

I claim:

1. A wall hanging system comprising:
   a retro-fit frame adapter including a longitudinal channel configured to engage a longitudinal rail of a wall mount, the retro-fit frame adapter including a wall-facing surface and a horizontal portion between the longitudinal channel and the wall-facing surface, the retro-fit frame adapter being attachable to an underside of a frame member of a frame without longitudinal channels;
   a wall mount formed with a longitudinally elongated body having upper and lower ends and a wall-facing surface, the upper end being formed with a longitudinal rail for engaging the longitudinal channel of the retro-fit frame adapter, the wall mount including a horizontal surface at the upper end between the longitudinal rail and the wall-facing surface, the horizontal surface supporting the horizontal portion of the retro-fit frame adapter, the wall mount including an attachment mechanism to attach the wall mount to a wall surface, the wall mount further including an embedded leveling indicator to enable level attachment of the wall mount to the wall surface; and
   a frame including a plurality of frame members without longitudinal channels, the retro-fit frame adapter being attached to an underside of one of the plurality of frame members of the frame, when the frame is hung on the wall mount, the longitudinal rail of the wall mount engages the longitudinal channel of the retro-fit frame adapter and the horizontal surface of the wall mount supports the horizontal portion of the retro-fit frame adapter, which supports the frame, the configuration of the longitudinal rail of the wall mount and the longitudinal channel of the retro-fit frame adapter enabling the frame to be hung vertically downward on the wall mount.

2. The wall hanging system of claim 1 wherein the attachment mechanism is adhesive strips on the wall-facing surface of the wall mount.

3. The wall hanging system of claim 1 wherein the attachment mechanism is a wall penetrating device on a room-facing surface of the wall mount.

4. The wall hanging system of claim 1 wherein the leveling indicator is a spirit level or a bubble level.

5. The wall hanging system of claim 1 wherein the wall mount further includes a laser pointer directed longitudinally parallel to the wall mount.

6. The wall hanging system of claim 1 wherein the wall mount is formed with a longitudinal groove in which the leveling indicator is embedded.

7. The wall hanging system of claim 1 wherein the frame is configured to enable adjustment of the position of the frame laterally left or right while the frame is mounted on the wall mount.

8. The wall hanging system of claim 1 wherein the wall mount and the frame are both fabricated from the same material from the group consisting of: wood, metal, composite, and plastic.

9. The wall hanging system of claim 1 wherein the frame includes a wall hanging item that includes a backing substructure fabricated from a material from the group:
   corrugated backing, cardboard, cardstock, wood, composites, metal, plastic, acrylic, and foam core.

10. The wall hanging system of claim 1 wherein the wall hanging system is configured to display an image.

* * * * *